United States Patent
Qiu et al.

(10) Patent No.: US 9,197,032 B2
(45) Date of Patent: Nov. 24, 2015

(54) SYSTEMS AND METHODS FOR STABILIZED STIMULATED BRILLOUIN SCATTERING LASERS WITH ULTRA-LOW PHASE NOISE

(71) Applicant: Honeywell International Inc., Morristown, NJ (US)

(72) Inventors: Tiequn Qiu, Glendale, AZ (US); Jianfeng Wu, Tucson, AZ (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/243,794

(22) Filed: Apr. 2, 2014

(65) Prior Publication Data

US 2015/0288135 A1 Oct. 8, 2015

(51) Int. Cl.
 *H01S 3/10* (2006.01)
 *H01S 3/30* (2006.01)
 *H01S 3/067* (2006.01)

(52) U.S. Cl.
 CPC ............. *H01S 3/302* (2013.01); *H01S 3/06791* (2013.01)

(58) Field of Classification Search
 CPC ....... H01S 3/067; H01S 3/06791; H01S 3/10; H01S 3/10053; H01S 3/10092; H01S 3/108; H01S 3/1305; H01S 3/30; H01S 3/302
 See application file for complete search history.

(56) References Cited

U.S. PATENT DOCUMENTS

| 7,272,160 | B1 | 9/2007 | Geng et al. | |
| 2007/0264024 | A1* | 11/2007 | Zheng et al. | 398/147 |
| 2008/0158656 | A1* | 7/2008 | McKinstrie | 359/330 |
| 2011/0134940 | A1* | 6/2011 | Hartog | 372/6 |
| 2012/0300198 | A1 | 11/2012 | Wu et al. | |
| 2013/0083813 | A1 | 4/2013 | Hartog | |
| 2014/0044142 | A1 | 2/2014 | Strandjord et al. | |

FOREIGN PATENT DOCUMENTS

| EP | 2573600 | 3/2013 |
| EP | 2685213 | 1/2014 |

OTHER PUBLICATIONS

Geng et al, "Highly Stable Low-Noise Brillouin Fiber Laser With Ultranarrow Spectral Linewidth", "IEEE Photonics Technology Letters", Sep. 1, 2006, pp. 1813-1815, vol. 18, No. 17, Publisher: IEEE.
European Patent Office, "Extended European Search Report from EP Application No. 15159754.9 mailed 08131/2015", "from foreign counterpart of U.S. Appl. No. 14/243,794", Aug. 31, 2015, pp. 16, Published in: EP.

* cited by examiner

*Primary Examiner* — Yuanda Zhang
(74) *Attorney, Agent, or Firm* — Fogg & Powers LLC

(57) ABSTRACT

Systems and methods for stabilized stimulated Brillouin scattering lasers with ultra-low phase noise are provided. In one embodiment, a method for producing a Stimulated Brillouin Scattering (SBS) beam comprises: generating laser light from a tunable laser source; splitting the laser light into a first light beam and a second light beam; creating a phase modulated light beam by applying a phase modulation to the first light beam; locking a frequency of the laser light to a frequency of a ring cavity using the phase modulated light beam and a Pound-Drever-Hall servo loop coupled to the tunable laser source; coupling the second light beam into the ring cavity in a direction of travel opposite to that of the phase modulated light beam; generating a Stimulated Brillouin Scattering light beam in the ring cavity from the second light beam; and outputting the Stimulated Brillouin Scattering light beam.

17 Claims, 5 Drawing Sheets

Wavelength Division Multiplexer (WDM)

US 9,197,032 B2

SYSTEMS AND METHODS FOR STABILIZED STIMULATED BRILLOUIN SCATTERING LASERS WITH ULTRA-LOW PHASE NOISE

BACKGROUND

Resonator fiber optic gyroscopes (RFOG) require single frequency lasers with ultra-low phase noise to improve accuracy of the rotation rate measurements. Such ultra-low phase noise lasers are very hard to obtain and are often not good enough for a high performance RFOG. It has been known that stimulated Brillouin scattering (SBS) lasers can generate light with substantially reduced phase noise and relative intensity noise (RIN) compared to their pump lasers. However, the pumping schemes of these prior art SBS lasers have challenges with separately optimizing the pump laser stabilization process and the SBS laser operation. Improved SBS lasers with ultra-low phase noise are needed for achieving high performance RFOG.

For the reasons stated above and for other reasons stated below which will become apparent to those skilled in the art upon reading and understanding the specification, there is a need in the art for improved systems and methods for stabilized stimulated Brillouin scattering lasers.

SUMMARY

The Embodiments of the present disclosure provide methods and systems for stimulated Brillouin scattering lasers and will be understood by reading and studying the following specification.

Systems and methods for stabilized stimulated Brillouin scattering lasers with ultra-low phase noise are provided. In one embodiment, a method for producing a Stimulated Brillouin Scattering (SBS) beam comprises: generating laser light from a tunable laser source; splitting the laser light into a first light beam and a second light beam; creating a phase modulated light beam by applying a phase modulation to the first light beam; locking a frequency of the laser light to a frequency of a ring cavity using the phase modulated light beam and a Pound-Drever-Hall servo loop coupled to the tunable laser source; coupling the second light beam into the ring cavity in a direction of travel opposite to that of the phase modulated light beam; generating a Stimulated Brillouin Scattering light beam in the ring cavity from the second light beam; and outputting the Stimulated Brillouin Scattering light beam.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the embodiments, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide for a low phase noise ring laser by introducing a structure that incorporates a first optical loop path to propagate a pump beam that is used for producing Stimulated Brillouin Scattering (SBS) laser light and a separate second optical loop path comprising phase modulated light used for stabilizing the laser producing the pump beam.

Figure 1:
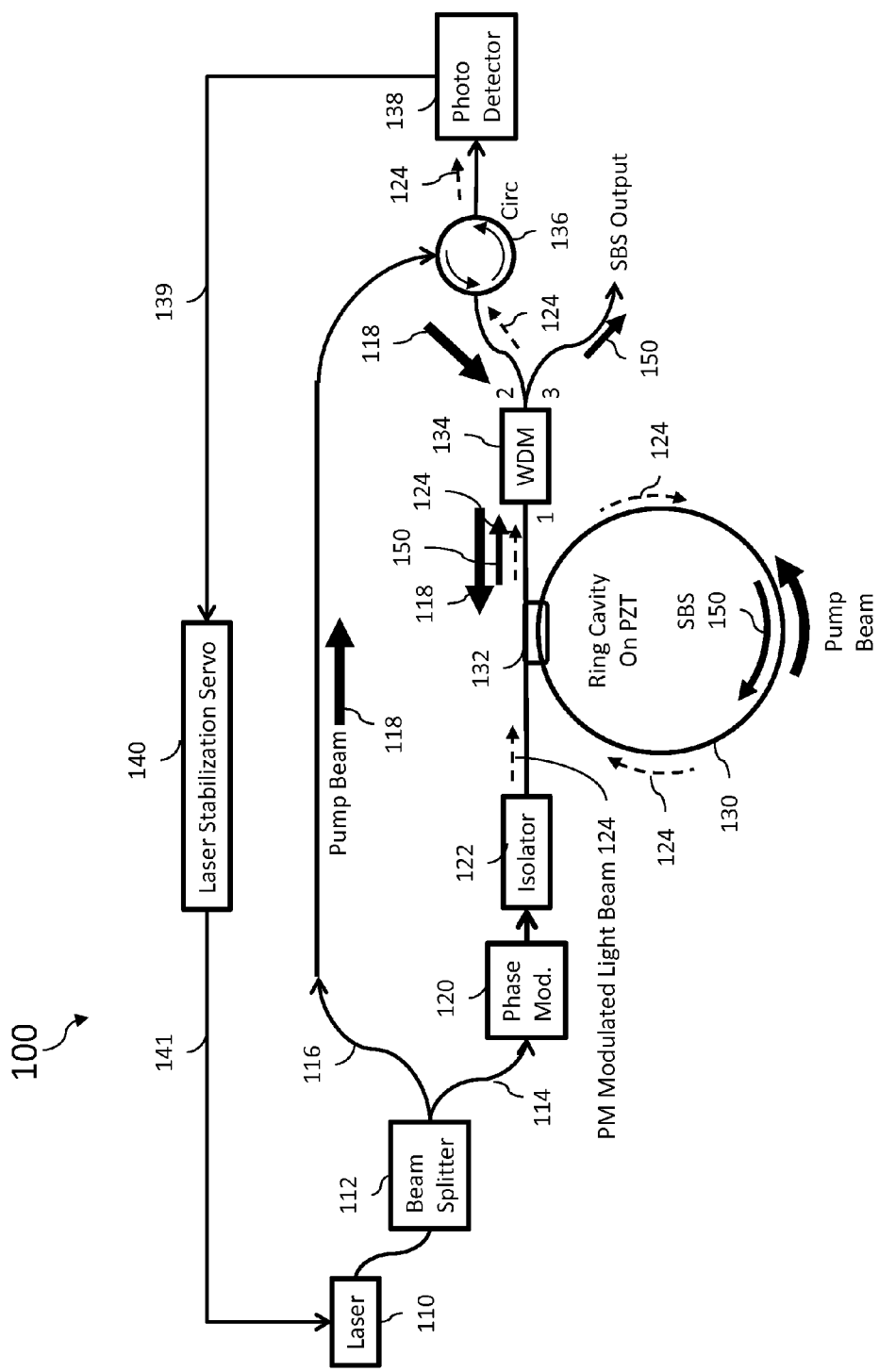
FIG. 1 is a block diagram illustrating a stabilized stimulated Brillouin scattering laser of one embodiment of the present disclosure.

FIG. 1 is a block diagram illustrating a stabilized stimulated Brillouin scattering laser apparatus 100 of one embodiment of the present disclosure. Laser apparatus 100 comprises a frequency tunable laser light source 110 having a laser light output coupled (for example, by an optical fiber) to a beam splitter 112. Beam splitter 112 splits the laser light output from laser light source 110 directing a first beam to a first optical loop path (shown at 114) and a second beam to a second optical loop path (shown at 116).

The first optical loop path 114 is utilized to implement a Pound-Drever-Hall (PDH) feedback loop to stabilize the laser frequency to the resonance of a reference ring cavity. As shown in FIG. 1, first optical loop path 114 comprises a phase modulator 120, an optical isolator 122, a ring cavity 130, an optical coupler 132, a wave division multiplexer (WDM) 134, a circulator (Circ.) 136, a fast photo detector 138, and a laser stabilization servo 140. In the embodiment shown in FIG. 1, ring cavity 130 comprises a ring cavity mounted onto a piezoelectric transducer (PZT).

A first beam output 114 from the beam splitter 112 is passed through phase modulator 120, where a phase modulation is applied to produce a modulated light beam (indicated in FIG. 1 as modulated light beam 124). The modulated light beam 124 (which may also be referred to as the PDH light beam) is coupled into the ring cavity 130 by optical coupler 132 such that it propagates around the ring cavity 130 in a first direction of propagation (for example, a clockwise (CW) direction). In the embodiment of FIG. 1, the modulated light beam 124 is shown as passing through an optical isolator 122, which is essentially a one-way device that allows light to pass through in one direction, but not through the opposite direction. In this arrangement, optical isolator 122 serves to prevent optical energy from entering into the output port of phase modulator 120 and otherwise interfering with the operation of laser light source 110.

The light beam 124 is further coupled out of the ring cavity 130 by optical coupler 132 and directed by WDM 134 and Circulator 136 to the photo detector 138. Photo detector 138 converts the light beam 124 into an electrical signal 139 which is provided to Laser Stabilization Servo 140. Laser Stabilization Servo 140 demodulates the electrical signal 139 at the same modulation frequency applied by phase modulator 120 to create the modulated light beam 124. The result is a correction signal 141 provided by servo 140 as feedback to the tunable laser light source 110, enabling tuning of the frequency of the laser light to match the resonance condition of the ring cavity 130. Once locked onto the ring cavity resonance, light from laser light source 110 is efficiently coupled into ring cavity 130. The linewidth of the laser 110 is also substantially reduced. The intensity of the PDH light is kept below SBS threshold so that the PDH beam does not generate SBS light.

The second optical loop path 116 is utilized to inject a narrow linewidth pump beam into the ring cavity 130 to produce a Stimulated Brillouin Scattering (SBS) beam that has ultra-low phase noise. Stimulated Brillouin Scattering is an effect that occurs when an incident light wave propagating through a medium such as optical fiber reaches a threshold power that results in an acoustic wave within the fiber. This acoustic wave excitation alters the refractive index of the fiber glass, causing a scattering of the incident light. The incident light beam is referred to as the "pump beam" while the scattered beam may be referred to as the "SBS beam" or "Stokes wave" beam. In an optical waveguide, SBS usually propagates in the opposite direction of pump laser beams. The scattering effect transfers some of the power from the pump beam to the SBS beam so that the SBS beam has a lower optical frequency than the pump beam, shifted by approximately 11 GHz (0.09 nm) for an silica optical fiber medium.

Referring to FIG. 1, a second beam output from beam splitter 112 propagates through the second optical loop path 116 as pump beam 118. Pump beam 118 is directed around circulator 136 to the circulator port coupled to WDM 134 and passes through WDM 134 to be coupled into ring cavity 130 via optical coupler 132. As shown in FIG. 1, pump beam 118 enters coupler 132 on a port opposite to the port which modulated light beam 124 enters coupler 132. As a result, while the modulated light beam 124 as coupled will propagate around ring cavity 130 in a first direction (e.g. clockwise as shown in FIG. 1), the pump beam 118 will propagate around ring cavity 130 in a second direction that is opposite to that of the first direction (e.g. counter-clockwise as shown in FIG. 1). Pump beam 118 travels through ring cavity 130 with sufficiently strong power to exceed the threshold for producing the SBS effect. This results in an SBS beam 150 generated in ring cavity 130, propagating in the opposite direction as the incident pump beam 118 and having a frequency shifted down from that of pump beam 118 by approximately 11 GHz. Accordingly, SBS beam 150 will propagate along the same path and direction as modulated light beam 124 and exit ring cavity 130 via coupler 132 to WDM 134.

Figure 3:
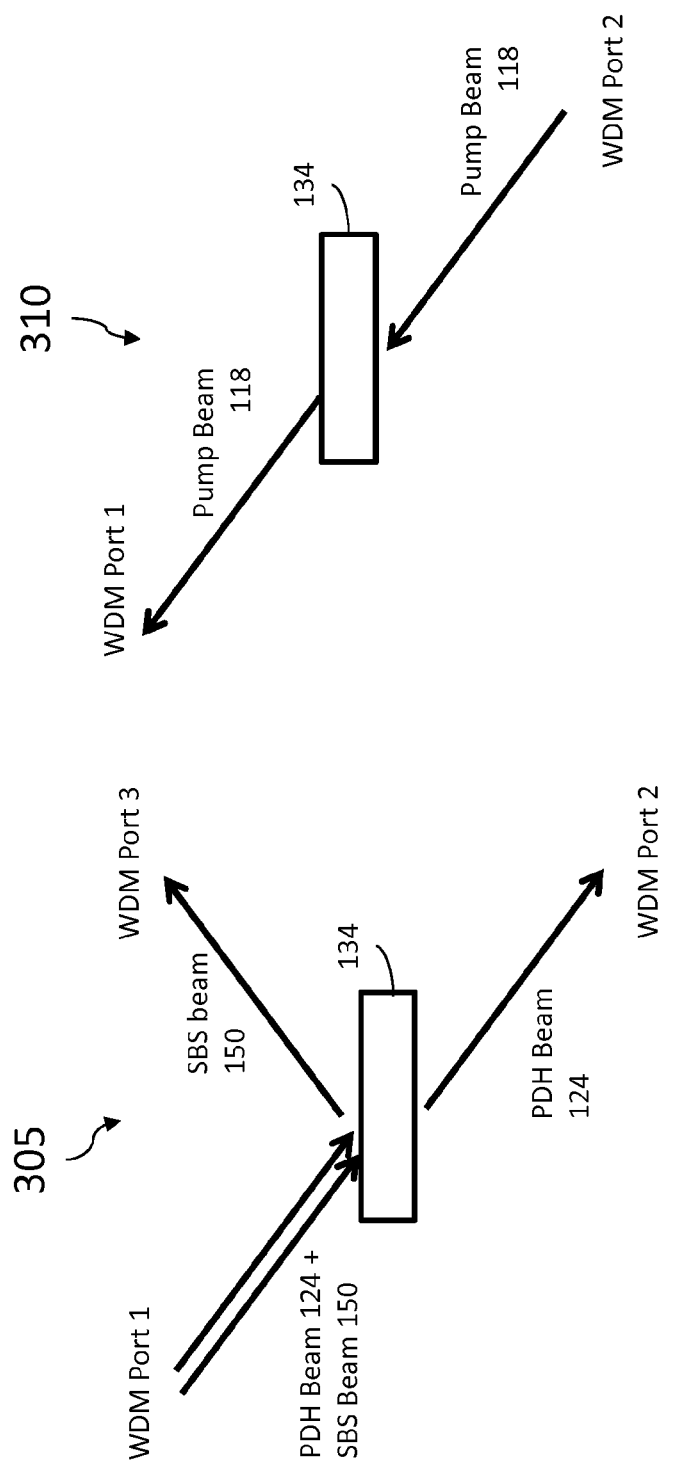
FIGS. 3 and 4 are diagrams illustrating a wavelength division multiplexer of one embodiment of the present disclosure.

With respect to light coming from coupler 132, the function of WDM 134 is to separate the modulated light 124 from the SBS beam 150. The function performed by WDM 134 is illustrated generally in FIG. 3 at 305 and 310. As shown generally at 305, light entering at port 1 of WDM 134 comes from coupler 132 and will include a first component comprising the modulated light beam 124 (which is of the same base frequency as pump beam 118) and a second component comprising the SBS beam 150. In one embodiment, as shown at 305, the higher frequency first component comprising modulated light beam 124 passes through WDM 134 and is directed out port 2, after which is travels around circulator 136 to photo detector 138 as described above. The offset frequency second component comprising SBS beam 150 falls within a spectrum of light which is reflected within WDM 134 to port 3, which is the SBS output of system 100. Referring to FIG. 3 at 310 it can be seen that the pump beam 118 that enters port 2 of WDM 134 also falls within a frequency spectrum that passes through WDM 134 without reflection to port 3, and therefore is directed to exit port 1 from which it propagates on towards ring cavity 130.

Figure 4:
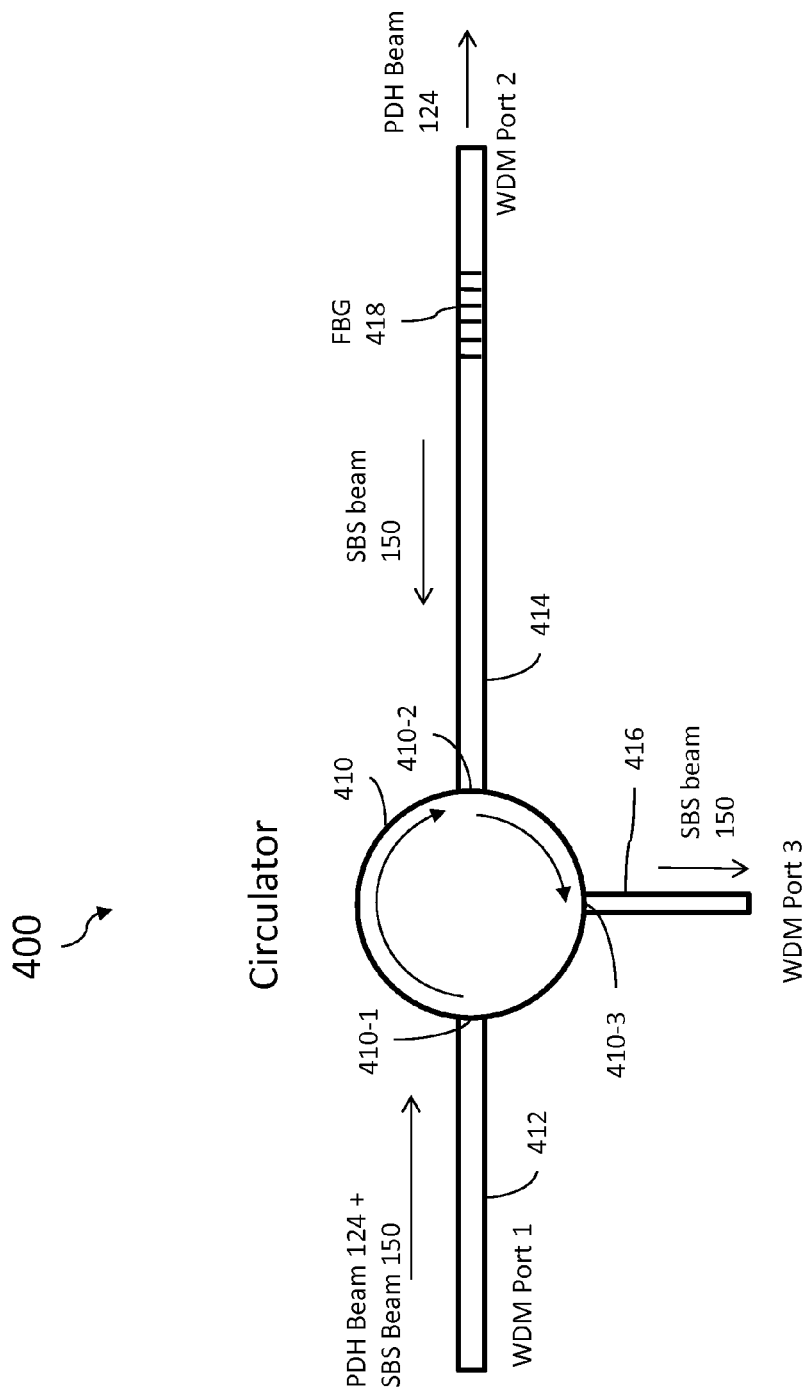

FIG. 4 illustrates at 400 an alternate implementation of WDM 134 comprising a circulator 410 and a narrow band Fiber Bragg Grating 418. In this embodiment, light entering at port 1 of WDM 134 (which includes the first component comprising the modulated light beam 124 and the second component comprising the SBS beam 150) is coupled into a fiber pigtail 412 and into a first port 410-1 of circulator 410. This light travels around circulator 410, exiting at port 410-2 of the circulator into fiber pigtail 414. Fiber pigtail 414 comprises the Fiber Bragg Grating 418, which is tuned to pass all light except for a narrow bandwidth that includes the SBS beam 150, which is reflected. Accordingly, the modulated light beam 124 passes through FBG 418 and out port 2 of WDM 134 while SBS beam 150 is reflected back into port 410-2 of circulator 410-2. SBS beam 150 travels around circulator 410, this time exiting at port 410-3 of the circulator into fiber pigtail 416, which is coupled to the SBS output of system 100.

This design therefore stabilizes the laser source to the ring cavity using a fast Pound-Drever-Hall (PDH) servo loop while reducing interference between the PDH light beam and the SBS producing pump beam by separating them into different path while still using a single ring cavity. The generated SBS light beam will also have low phase noise and relative intensity noise due to the avoidance of interference between the pump beam, the SBS beam and the modulated PDH light beam. The pump beam is not modulated so that all the power is concentrated on a single frequency, leading to lower SBS generation threshold. The pump power and the modulation of the PDH beam can be separately optimized for more stable and robust operation of the system.

Figure 2:
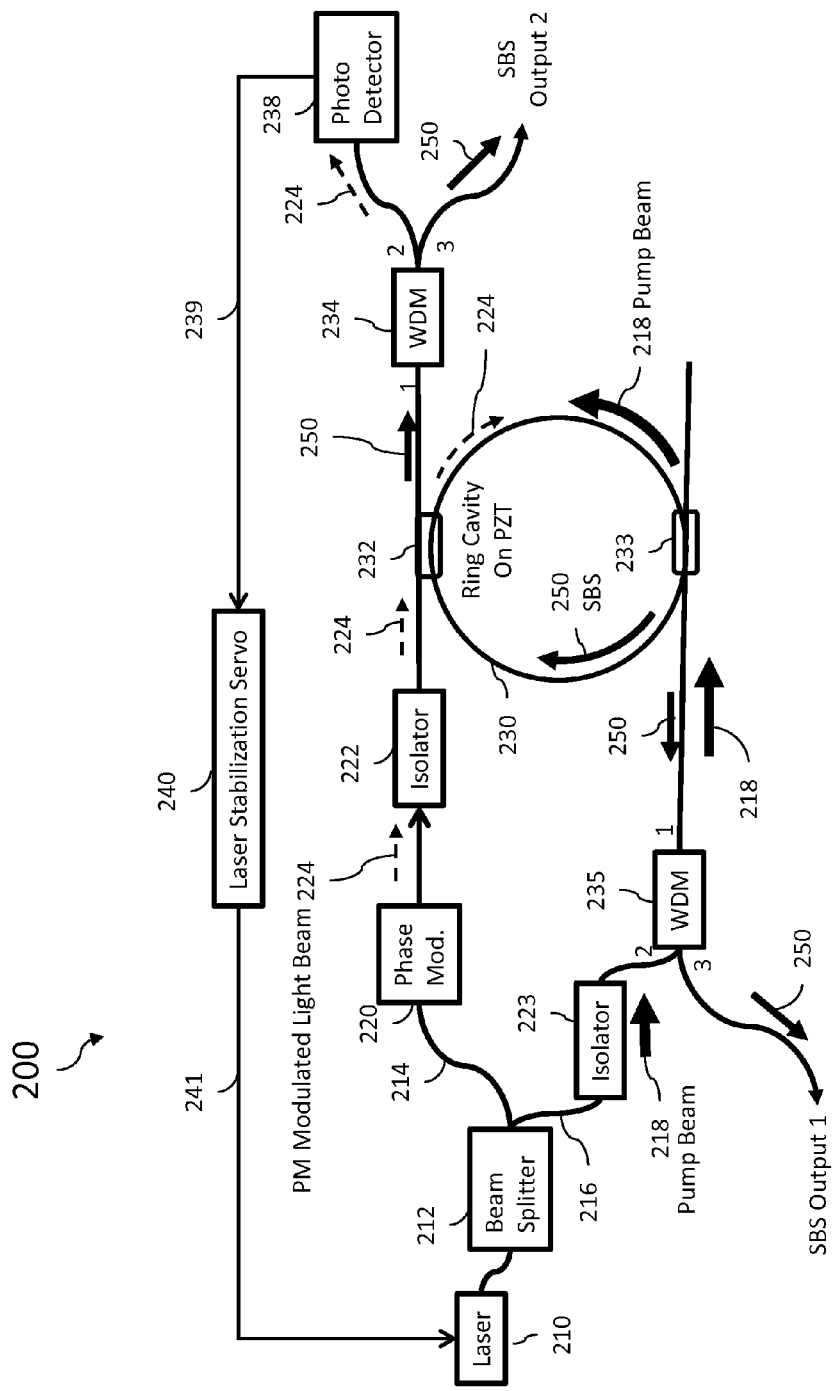
FIG. 2 is a block diagram illustrating a stabilized stimulated Brillouin scattering laser of one embodiment of the present disclosure.

FIG. 2 illustrates another embodiment of stabilized stimulated Brillouin scattering laser apparatus 200 of the present disclosure. Stimulated Brillouin scattering laser apparatus 200 operates under the same premise as apparatus 100 but is configured to provide two independent SBS outputs (shown as SBS Output 1 and SBS Output 2). Apparatus 200 comprises a frequency tunable laser light source 210 having a laser light output coupled (for example, by an optical fiber) to a beam splitter 212. Beam splitter 212 splits the laser light output from laser light source 210 directing a first beam to a first optical loop path (shown at 214) and a second beam to a second optical loop path (shown at 216).

The first optical loop path 214 is utilized to implement a Pound-Drever-Hall (PDH) feedback loop to stabilize the laser frequency to the resonance of a reference ring cavity 230. As shown in FIG. 2, first optical loop path 214 comprises a phase modulator 220, an optical isolator 222, a ring cavity 230, a first optical coupler 232, a first wavelength division multiplexer (WDM) 234, a fast photo detector 238, and a laser stabilization servo 240. In the embodiment shown in FIG. 2, ring cavity 230 comprises a ring cavity mounted onto a piezoelectric transducer (PZT).

A first beam output 214 from the beam splitter 212 is passed through phase modulator 220, where a phase modulation is applied to produce a modulated light beam (indicated in FIG. 2 as modulated light beam 224). The modulated light beam 224 (which may also be referred to as the PDH light beam) is coupled into the ring cavity 230 by the first optical coupler 232 such that it propagates around the ring cavity 230 in a first direction of propagation (for example, a clockwise (CW) direction). In the embodiment of FIG. 2, the modulated light beam 224 is shown as passing through an optical isolator 222, which as described above for isolator 122, serves to prevent optical energy from entering into the output port of phase modulator 220 and otherwise interfering with the operation of laser light source 210.

The light beam 224 is further coupled out of the ring cavity 230 by the first optical coupler 232 and directed by WDM 234 to the photo detector 238. Photo detector 238 converts the light beam 224 into an electrical signal 239 which is provided to Laser Stabilization Servo 240. Laser Stabilization Servo 240 demodulates the electrical signal 239 at the same modulation frequency applied by phase modulator 220 to create the modulated light beam 224. The result is a correction signal 241 provided by servo 240 as feedback to the tunable laser light source 210, enabling tuning of the frequency of the laser to match the resonance condition of the ring cavity 230. Once locked onto the ring cavity resonance, light from laser light source 210 can be much more efficiently coupled into ring cavity 230. Its phase noise is also significantly reduced. The intensity of the PDH light is kept below SBS threshold so that the PDH beam does not generate SBS light.

The second optical loop path 216 is utilized to produce a Stimulated Brillouin Scattering (SBS) beam from ring cavity 230. Referring to FIG. 2, a second beam output from beam splitter 212 propagates through the second optical loop path 216 as pump beam 218. Pump beam 218 passes through isolator 223 and is directed to port 2 of a second WDM 235, passes through the second WDM 235 and is coupled into ring cavity 230 via a second optical coupler 233. As shown in FIG. 2, pump beam 218 enters the second coupler 233. While the modulated light beam 224 is coupled by coupler 232 to propagate around ring cavity 230 in a first direction (e.g. clockwise as shown in FIG. 2), the pump beam 218 is coupled by coupler 233 to propagate around ring cavity 230 in a second direction that is opposite to that of the first direction (e.g. counter-clockwise as shown in FIG. 2). Pump beam 218 travels through ring cavity 230 with sufficiently strong power to exceed the threshold for producing the SBS effect. This results in an SBS beam 250 generated in ring cavity 230, propagating in the opposite direction as the incident pump beam 218 and having a frequency shifted down from that of pump beam 218 by approximately 11 GHz.

In contrast to FIG. 1, the apparatus 200 in FIG. 2 includes two couplers 232 and 233 from which the SBS beam 250 may be tapped from ring cavity 230. Each of the two WDMs 234 and 235 may operate in the same manner as described above with respect to FIGS. 1, 3 and 4. From coupler 232, SBS beam 250 may be coupled out of ring cavity 230 to the first port of WDM 234. The PDH light beam 224 exits WDM 234 at port 2 from which it is forwarded to photo detector 238. SBS beam 250, having a frequency offset from PDH light beam 224 of 11 GHz, is separated out and exits WDM 234 at port 3 as SBS Output 2. From coupler 233, SBS beam 250 may also be coupled out of ring cavity 230 to the first port of WDM 235. SBS beam 250, having a frequency offset from PDH light beam 224 of 11 GHz, is separated out and exits WDM 235 at port 3 as SBS Output 1. Any portion of PDH light beam 224 that exits WDM 235 at port 2 is terminated from further propagation at isolator 223.

Figure 5:
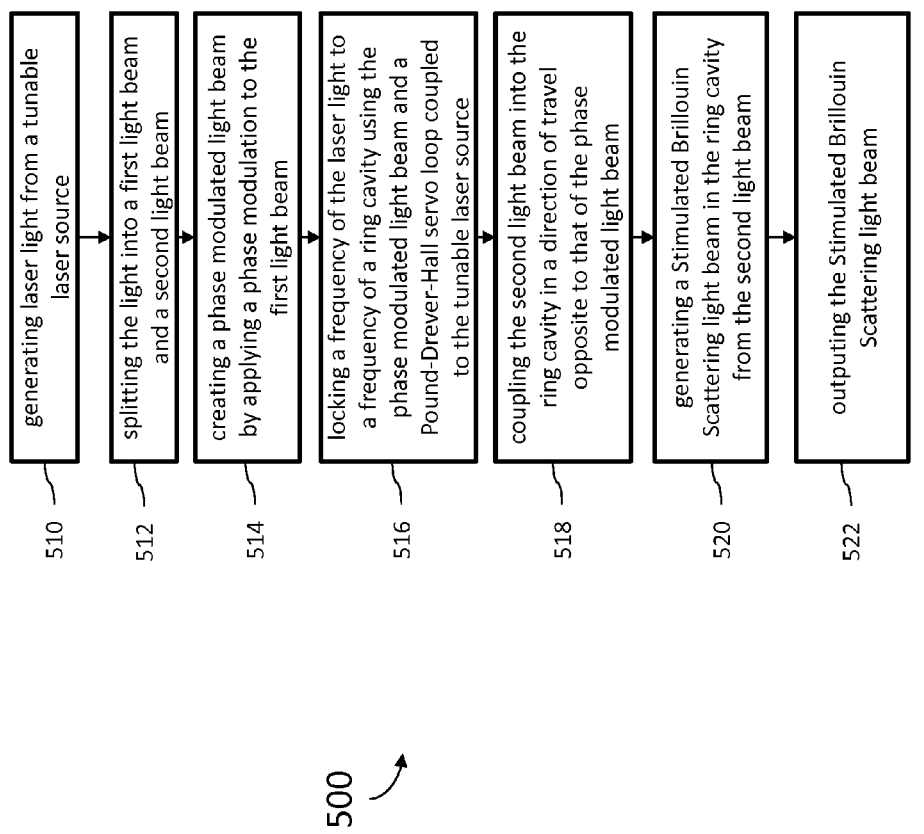
FIG. 5 is a flow chart illustrating a method of one embodiment of the present disclosure.

FIG. 5 is a flow chart illustrating a method 500 of one embodiment of the present disclosure. In alternate embodiments, method 500 may be used in conjunction with or combined with any of the embodiments described with respect to FIGS. 1-4. Method 500 begins at 510 with generating laser light from a tunable laser source and proceeds to 512 with splitting the laser light into a first light beam and a second light beam. The first light beam travels a first optical loop path which is utilized to implement a Pound-Drever-Hall (PDH) feedback loop to stabilize the laser frequency to match the resonance frequency of a reference ring cavity. The second light beam travels a second optical loop path which is utilized to produce at least one Stimulated Brillouin Scattering (SBS) beam from the ring cavity.

The method proceeds to 514 with creating a phase modulated light beam by applying a phase modulation to the first light beam. In one embodiment, the first light beam is passed through phase modulator where a phase modulation is applied to produce a modulated light beam. The modulated light beam (which may also be referred to as the PDH light beam) is coupled into the ring cavity so that it propagates around the ring cavity in a first direction of propagation (for example, a clockwise (CW) direction).

The method proceeds to 516 with locking a frequency of the laser light to a frequency of a ring cavity using the phase modulated light beam and a Pound-Drever-Hall servo loop coupled to the tunable laser source. In one embodiment, the modulated light beam is reflected from the ring cavity and directed to a photo detector. The photo detector converts the light beam into an electrical signal which is demodulated by a Laser Stabilization Servo at the same modulation frequency applied by phase modulator. The result is a correction signal provided as feedback to the tunable laser light source, locking the frequency of the laser light to match the resonance condition of the ring cavity. Once locked onto a ring cavity resonance frequency, light from the tunable laser source can be much more efficiently coupled into the ring cavity. The intensity of the PDH light is kept below SBS threshold so that the PDH beam does not generate SBS light.

The method proceeds to 518 with coupling the second light beam into the ring cavity in a direction of travel opposite to that of the phase modulated light beam and to 520 with generating a Stimulated Brillouin Scattering light beam in the ring cavity from the second light beam. The second light beam propagates through s second optical loop as a pump beam that is coupled into the ring cavity and travels through ring cavity with sufficiently strong power to exceed the threshold for producing an SBS effect. This results in the SBS light beam generated in the ring cavity, propagating in the opposite direction as the incident pump beam and having a frequency shifted down from that of pump beam by approximately 11 GHz. The method then proceeds to 522 with outputting the Stimulated Brillouin Scattering light beam. In one embodiment, outputting the SBS light beam comprises coupling the beam out of the ring cavity at one or more optical couplers and directing the SBS light beam to one or more designated outputs.

EXAMPLE EMBODIMENTS

Example 1 includes a method for producing a Stimulated Brillouin Scattering (SBS) beam, the method comprising: generating laser light from a tunable laser source; splitting the laser light into a first light beam and a second light beam; creating a phase modulated light beam by applying a phase modulation to the first light beam; locking a frequency of the laser light to a frequency of a ring cavity using the phase modulated light beam and a Pound-Drever-Hall servo loop coupled to the tunable laser source; coupling the second light beam into the ring cavity in a direction of travel opposite to that of the phase modulated light beam; generating a Stimulated Brillouin Scattering light beam in the ring cavity from the second light beam; and outputting the Stimulated Brillouin Scattering light beam.

Example 2 includes the method of example 1, wherein the power of the modulated light beam is kept below a threshold for producing a Stimulated Brillouin Scattering effect and optimized for Pound-Drever-Hall servo operation.

Example 3 includes the method of example 2, further comprising: coupling the modulated light beam out of the ring cavity; and directing the modulated light beam to a photo detector, wherein the photo detector converts the modulated light beam into an electrical signal.

Example 4 includes the method of example 3, wherein the phase modulation is applied at a first modulation frequency, the method further comprising: generating a correction signal by demodulating the electrical signal at the modulation frequency; and locking the frequency of the tunable laser light source to a resonance frequency of the ring cavity with the correction signal.

Example 5 includes the method of any of examples 3-5 further comprising: coupling a third light beam from the ring cavity, the third light beam including a first component comprising the modulated light beam and a second component comprising the Stimulated Brillouin Scattering light beam; separating the Stimulated Brillouin Scattering light beam from the third light beam and directing the Stimulated Brillouin Scattering light beam to an output; and separating the modulated light beam and directing it to the photo detector.

Example 6 includes the method of any of examples 1-5, wherein the second light beam propagates through a second optical loop as a pump beam that is coupled into the ring cavity and travels through ring cavity in the opposite direction of the phase modulated light beam with sufficiently strong power to at least meet a threshold for producing a Stimulated Brillouin Scattering effect.

Example 7 includes the method of any of example 1-6, wherein the Stimulated Brillouin Scattering light beam is offset in frequency from the pump beam by approximately 11 GHz.

Example 8 includes a method for producing a Stimulated Brillouin Scattering (SBS) beam, the method comprising: generating laser light from a tunable laser source; splitting the laser light into a first light beam and a second light beam; directing the first light beam to a first optical loop path that includes a ring cavity and generates a Pound-Drever-Hall (PDH) generated feedback signal back to the tunable laser source; and directing the second light beam to a second loop path that includes the ring cavity and produces a Stimulated Brillouin Scattering (SBS) beam within the ring cavity; wherein the first light beam and the second light beam propagate in opposite directions around the ring cavity.

Example 9 includes the method of example 8, further comprising: creating a phase modulated light beam by applying a phase modulation to the first light beam and coupling the phase modulated light beam into the ring cavity; coupling the modulated light beam out of the ring cavity, where the power of the phase modulated light beam is kept below a threshold for producing a Stimulated Brillouin Scattering effect and optimized for Pound-Drever-Hall servo operation; and directing the modulated light beam to a photo detector, wherein the photo detector converts the modulated light beam into an electrical signal.

Example 10 includes the method of example 9, wherein the phase modulation is applied at a first modulation frequency, the method further comprising: generating a correction signal by demodulating the electrical signal at the modulation frequency; and controlling the tunable laser light source with the correction signal.

Example 11 includes the method of example 10 further comprising: coupling a third light beam from the ring cavity, the third light beam including a first component comprising the modulated light beam and a second component comprising the Stimulated Brillouin Scattering light beam; and separating the Stimulated Brillouin Scattering light beam from the third light beam and directing the Stimulated Brillouin Scattering light beam to an output; separating the modulated light beam and directing it to the photo detector.

Example 12 includes an apparatus for producing a Stimulated Brillouin Scattering (SBS) beam, the apparatus comprising: a tunable laser light source; a ring cavity; a beam splitter coupled to the tunable laser light source, the beam splitter splitting a laser beam from the tunable laser light source into a first light beam coupled to a first optical path, and a second light beam coupled to a second optical path; wherein the first optical loop path implements a Pound-Drever-Hall (PDH) loop that generated feedback signal to lock the tunable laser source to the ring cavity; wherein the second loop path includes the ring cavity and produces a Stimulated Brillouin Scattering (SBS) light beam within the ring cavity; and wherein the first light beam is coupled into the ring cavity to travel around the ring cavity in a first direction and the second light beam is coupled into the ring cavity to travel around the ring cavity is a second direction opposite to the first direction.

Example 13 includes the apparatus of example 12, wherein the first optical loop path modulates the first light beam into a modulated light beam, couples the modulated light beam into the ring cavity, couples the modulated light beam from the ring cavity to a photo detector, where the photo detector generates an electrical signal from the modulated light beam; the apparatus further comprising: a servo that generates a feedback control signal from the electrical signal, the servo coupled to the tunable laser light source.

Example 14 includes the apparatus of any of examples 12-13, the first optical loop path further comprising: a phase modulator having an input coupled to the beam splitter and a modulated light beam output coupled to the ring cavity via a coupler, wherein the coupler couples the modulated light beam into the ring cavity and couples out from the ring cavity the modulated light beam and the Stimulated Brillouin Scattering light beam; a wavelength division multiplexer coupled to the coupler, wherein the wave division multiplexer receives the modulated light beam and the Stimulated Brillouin Scattering light beam from the coupler; wherein the wavelength division multiplexer directs the modulated light beam to the photo detector and directs the Stimulated Brillouin Scattering light beam to a first output.

Example 15 includes the apparatus of example 14, wherein the power of the modulated light beam is kept below a threshold for producing a Stimulated Brillouin Scattering effect and optimized for Pound-Drever-Hall servo operation.

Example 16 includes the apparatus of any of examples 14-15, further comprising: a second coupler, wherein the second light beam is coupled into the ring cavity by the second coupler; and a second wavelength division multiplexer coupled to the second coupler, wherein the second wave division multiplexer receives the modulated light beam and the Stimulated Brillouin Scattering light beam from the coupler; wherein the wavelength division multiplexer directs the Stimulated Brillouin Scattering light beam to a second output.

Example 17 includes the apparatus of any of examples 12-16, wherein the tunable laser light source generates the laser beam so that the second light beam propagates through ring cavity with sufficiently power to produce a Stimulated Brillouin Scattering effect.

Example 18 includes the apparatus of any of examples 12-17, wherein the Stimulated Brillouin Scattering light beam is offset in frequency from the second light beam by approximately 11 GHz.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present embodiments. Therefore, it is manifestly intended that embodiments be limited only by the claims and the equivalents thereof.

What is claimed is:

1. A method for producing a Stimulated Brillouin Scattering (SBS) beam, the method comprising:
    generating laser light from a tunable laser source;
    splitting the laser light into a first light beam and a second light beam;
    creating a phase modulated light beam by applying a phase modulation to the first light beam;
    locking a frequency of the laser light to a frequency of a ring cavity using the phase modulated light beam and a Pound-Drever-Hall servo loop coupled to the tunable laser source;
    coupling the second light beam into the ring cavity in a direction of travel opposite to that of the phase modulated light beam;
    generating a Stimulated Brillouin Scattering light beam in the ring cavity from the second light beam; and
    outputting the Stimulated Brillouin Scattering light beam;
    wherein the phase modulation is applied with a phase modulator having a modulated light beam output coupled to the ring cavity via a coupler, wherein the coupler couples the modulated light beam into the ring cavity and couples out from the ring cavity the modulated light beam and the Stimulated Brillouin Scattering light beam;
    wherein a wavelength division multiplexer coupled to the coupler receives the modulated light beam and the Stimulated Brillouin Scattering light beam from the coupler; and
    wherein the wavelength division multiplexer directs the modulated light beam to a photo detector and directs the Stimulated Brillouin Scattering light beam to a first output.

2. The method of claim 1, wherein the power of the modulated light beam is kept below a threshold for producing a Stimulated Brillouin Scattering effect and optimized for Pound-Drever-Hall servo operation.

3. The method of claim 2, further comprising:
    coupling the modulated light beam out of the ring cavity; and
    directing the modulated light beam to a photo detector, wherein the photo detector converts the modulated light beam into an electrical signal.

4. The method of claim 3, wherein the phase modulation is applied at a first modulation frequency, the method further comprising:
    generating a correction signal by demodulating the electrical signal at the modulation frequency; and
    locking the frequency of the tunable laser light source to a resonance frequency of the ring cavity with the correction signal.

5. The method of claim 3 further comprising:
    coupling a third light beam from the ring cavity, the third light beam including a first component comprising the modulated light beam and a second component comprising the Stimulated Brillouin Scattering light beam; and
    separating the Stimulated Brillouin Scattering light beam from the third light beam and directing the Stimulated Brillouin Scattering light beam to an output;
    separating the modulated light beam and directing it to the photo detector.

6. The method of claim 1, wherein the second light beam propagates through a second optical loop as a pump beam that is coupled into the ring cavity and travels through ring cavity in the opposite direction of the phase modulated light beam with sufficiently strong power to at least meet a threshold for producing a Stimulated Brillouin Scattering effect.

7. The method of claim 1, wherein the Stimulated Brillouin Scattering light beam is offset in frequency from the pump beam by approximately 11 GHz.

8. A method for producing a Stimulated Brillouin Scattering (SBS) beam, the method comprising:
    generating laser light from a tunable laser source;
    splitting the laser light into a first light beam and a second light beam;
    directing the first light beam to a first optical loop path that includes a ring cavity and generates a Pound-Drever-Hall (PDH) generated feedback signal back to the tunable laser source; and
    directing the second light beam to a second loop path that includes the ring cavity and produces a Stimulated Brillouin Scattering (SBS) beam within the ring cavity;
    wherein the first light beam and the second light beam propagate in opposite directions around the ring cavity;
    wherein the first optical loop path comprises:
        a phase modulator having a modulated light beam output coupled to the ring cavity via a coupler, wherein the coupler couples the modulated light beam into the ring cavity and couples out from the ring cavity the modulated light beam and the Stimulated Brillouin Scattering light beam;
        a wavelength division multiplexer coupled to the coupler, wherein the wave division multiplexer receives the modulated light beam and the Stimulated Brillouin Scattering light beam from the coupler;
        wherein the wavelength division multiplexer directs the modulated light beam to a photo detector and directs the Stimulated Brillouin Scattering light beam to a first output.

9. The method of claim 8, further comprising:
    creating a phase modulated light beam by applying a phase modulation to the first light beam and coupling the phase modulated light beam into the ring cavity;
    coupling the modulated light beam out of the ring cavity, where the power of the phase modulated light beam is kept below a threshold for producing a Stimulated Brillouin Scattering effect and optimized for Pound-Drever-Hall servo operation; and
    directing the modulated light beam to a photo detector, wherein the photo detector converts the modulated light beam into an electrical signal.

10. The method of claim 9, wherein the phase modulation is applied at a first modulation frequency, the method further comprising:
    generating a correction signal by demodulating the electrical signal at the modulation frequency; and
    controlling the tunable laser light source with the correction signal.

11. The method of claim 10 further comprising:
coupling a third light beam from the ring cavity, the third light beam including a first component comprising the modulated light beam and a second component comprising the Stimulated Brillouin Scattering light beam;
separating the Stimulated Brillouin Scattering light beam from the third light beam and directing the Stimulated Brillouin Scattering light beam to an output; and
separating the modulated light beam and directing it to the photo detector.

12. An apparatus for producing a Stimulated Brillouin Scattering (SBS) beam, the apparatus comprising:
a tunable laser light source;
a ring cavity;
a beam splitter coupled to the tunable laser light source, the beam splitter splitting a laser beam from the tunable laser light source into a first light beam coupled to a first optical path, and a second light beam coupled to a second optical path;
wherein the first optical loop path implements a Pound-Drever-Hall (PDH) loop that generated feedback signal to lock the tunable laser source to the ring cavity;
wherein the second loop path includes the ring cavity and produces a Stimulated Brillouin Scattering (SBS) light beam within the ring cavity; and
wherein the first light beam is coupled into the ring cavity to travel around the ring cavity in a first direction and the second light beam is coupled into the ring cavity to travel around the ring cavity is a second direction opposite to the first direction;
the first optical loop path further comprising:
a phase modulator having an input coupled to the beam splitter and a modulated light beam output coupled to the ring cavity via a coupler, wherein the coupler couples the modulated light beam into the ring cavity and couples out from the ring cavity the modulated light beam and the Stimulated Brillouin Scattering light beam;
a wavelength division multiplexer coupled to the coupler, wherein the wave division multiplexer receives the modulated light beam and the Stimulated Brillouin Scattering light beam from the coupler;
wherein the wavelength division multiplexer directs the modulated light beam to the photo detector and directs the Stimulated Brillouin Scattering light beam to a first output.

13. The apparatus of claim 12, wherein the first optical loop path modulates the first light beam into a modulated light beam, couples the modulated light beam into the ring cavity, couples the modulated light beam from the ring cavity to a photo detector, where the photo detector generates an electrical signal from the modulated light beam; the apparatus further comprising:
a servo that generates a feedback control signal from the electrical signal, the servo coupled to the tunable laser light source.

14. The apparatus of claim 1, wherein the power of the modulated light beam is kept below a threshold for producing a Stimulated Brillouin Scattering effect and optimized for Pound-Drever-Hall servo operation.

15. The apparatus of claim 1, further comprising:
a second coupler, wherein the second light beam is coupled into the ring cavity by the second coupler; and
a second wavelength division multiplexer coupled to the second coupler, wherein the second wave division multiplexer receives the modulated light beam and the Stimulated Brillouin Scattering light beam from the coupler;
wherein the wavelength division multiplexer directs the Stimulated Brillouin Scattering light beam to a second output.

16. The apparatus of claim 12, wherein the tunable laser light source generates the laser beam so that the second light beam propagates through ring cavity with sufficiently power to produce a Stimulated Brillouin Scattering effect.

17. The apparatus of claim 12, wherein the Stimulated Brillouin Scattering light beam is offset in frequency from the second light beam by approximately 11 GHz.

* * * * *